United States Patent Office 2,712,532
Patented July 5, 1955

2,712,532

NEW POLYMERIC REACTION PRODUCTS OF MIXED POLYMETHYL BENZENES

Michael Mojzesz Szwarc, Syracuse, N. Y., and Alec Norman Roper, Manchester, England, assignors to Petrocarbon Limited, London, England No Drawing. Application August 28, 1952,
Serial No. 306,938

Claims priority, application Great Britain August 29, 1951

19 Claims. (Cl. 260—2)

In pending patent application Serial No. 306,940, filed on August 28, 1952 (continuation in part of patent application Serial No. 48,339, filed on September 8, 1949), there is described a process for the production of a solid polymer which comprises pyrolyzing the vapour of an aromatic hydrocarbon selected from polymethyl benzenes having from 2 to 6 methyl groups substituted in the nucleus with two methyl groups in the para positions of the nucleus by subjecting the vapour under subatmospheric pressure to a temperature between 700 and 1000° C., and preferably between 800 and 1000° C., for not more than 10 seconds, and preferably for not more than one second, and cooling the resulting vapours to a temperature at which a solid polymer is deposited.

It has now been found that solid copolymers can be obtained by the above process by pyrolyzing the mixed vapours of two or more of the polymethyl benzenes referred to in the manner described above and cooling the resulting vapours until a solid polymeric product is deposited.

It has been further ascertained that by this process valuable polymeric products are obtained which possess a high thermal stability and good electrical insulating properties but which may be more easily moulded or shaped than the polymers obtained from p-xylene.

The invention thus consists in a process for the production of a solid polymeric product in which the vapours of two or more of the polymethyl benzenes having from 2 to 6 methyl groups substituted in the nucleus, with two of the methyl groups in the para positions are pyrolyzed by being subjected at sub-atmospheric pressure to a temperature between 700 and 1000° C. for not more than 10 seconds and the pyrolyzed vapours are cooled to a temperature at which a solid polymeric product is deposited.

The starting materials which may be used for the production of the polymeric products of the invention are mixtures of two or more of the following: p-xylene, pseudocumene, durene, isodurene, prehnitene, pentamethyl benzene and hexamethyl benzene.

Suitable mixtures which may be used are mixtures of p-xylene and pseudocumene; pseudocumene and durene; durene and isodurene; p-xylene and isodurene. The preferred starting material is a binary mixture containing a major proportion of pseudocumene preferably with a minor proportion of p-xylene.

The copolymers produced by the process of the invention have properties intermediate those of the polymers produced from each of the components of the starting material by a similar process. Thus, the invention offers a valuable means of controlling to some extent the properties of the copolymer obtained.

Thus the polymer obtained from p-xylene alone is rather difficult to mould or shape and a more easily mouldable copolymer may be obtained from a mixture of p-xylene and pseudocumene as is evidenced by the following table:

TABLE

Copolymers obtained from mixtures of pseudocumene and p-xylene

| Percentage pseudocumene in vapour feed | Cloud Pt., ° C. (solvent 365) | Softening Pt., ° C. | Moulding, 300° C., ½ ton press |
|---|---|---|---|
| 80 | 105 | 250 | Complete sintering, flexible. |
| 70 | 120 | 260 | Do. |
| 65 | 140 | 260 | Do. |
| 44 | 160 | 286 | Incomplete sintering, slightly flexible. |
| 27 | 190 | 290 | Incomplete sintering, very slightly flexible. |

The above table also illustrates the variation in the solubility of the copolymers obtained as the proportion of pseudocumene in a starting material consisting of a mixture of p-xylene and pseudocumene is varied. The solvent 365 employed was an aromatic cut boiling in the range 365° to 500° C. obtained from the liquid products resulting from the Catarole petroleum aromatization and cracking process.

The contact times most suitable for use in the pyrolysis step of the process of the invention depend largely on the temperature at which the pyrolysis is carried out. It has been found that the higher the temperature is, the shorter is the contact time required to obtain optimum conversions.

The preferred temperature range is from 800 to 1000° C. and still more preferably from 850 to 950° C. The contact time should preferably not exceed 1 second and within the range 850 to 950° C. may suitably be from 0.5 to 0.02 second.

The most satisfactory results are obtained when the pyrolysis is carried out at sub-atmospheric pressures and preferably at pressures in the region of 10 mms. Hg absolute pressure and below. The pyrolysis may be carried out in the presence of an inert gas such as carbon dioxide or nitrogen, in which case the pressure exerted by the hydrocarbon vapour should preferably be in the region of 10 mms. Hg absolute pressure or below. When an inert gas is present it is desirable that the total vapour pressure should not exceed 200 mms. Hg absolute pressure, and it may suitably be between 100 and 200 mms. Hg absolute pressure.

The polymers or polymeric products of the invention are formed spontaneously on cooling the pyrolyzed vapours. The temperature to which the vapours should be cooled for condensation and polymerization to take place can easily be determined by experiment. It depends on the partial pressure of the monomer vapour in the gas phase and increases with increasing partial vapour pressure. Cooling to from 0 to 50° C., and preferably to room temperature, will, however, be generally found effective for this purpose in the processes of the invention.

The copolymers obtained in the process of the invention are formed by the copolymerization of the diradicals formed from the starting materials by the splitting off during the pyrolysis of two hydrogen atoms, one from each of the two methyl groups in the para positions.

Thus the copolymer obtained from a mixture of pseudocumene and p-xylene as starting material is formed by the copolymerization of the radicals 1,4-dimethylene-2-methyl benzene and 1,4-dimethylene benzene.

Similarly that obtained from a mixture of durene and isodurene is formed by the copolymerization of the radicals 1,4-dimethylene-2,5-dimethyl benzene and 2,5-dimethylene-1,3-dimethyl benzene.

As previously indicated the polymeric products obtained from a mixture of pseudocumene and p-xylene containing a major proportion of pseudocumene are more easily moulded and yield more flexible mouldings than those obtained from p-xylene alone. Similar results are obtained by incorporating a major proportion of isodurene with p-xylene or durene or by incorporating a major proportion of pseudocumene with durene in the starting material.

The invention is illustrated by the following examples.

EXAMPLE 1

A mixture of the vapours of pseudocumene and p-xylene in the proportions of 65 parts by weight of pseudocumene and 35 parts by weight of p-xylene was passed at a pressure of 2 mms. Hg absolute pressure through a silica tube heated to 900° C. at such a rate that the vapour was subjected to this temperature for 0.6 second. The vapour leaving the tube was passed into a trap in which it was cooled to approximately 18° C. in contact with a cold surface on which a polymeric product was deposited in the form of a yellowish coherent film. Pseudocumene was also condensed in the trap. The yellow film was washed with ether to remove condensed soluble material and recovered.

The polymeric product was flexible and on moulding at a temperature of about 300° C. and under moderate pressure, yielded a flexible rubbery product. This product had good electrical insulating properties and was capable of withstanding temperatures up to at least 200° C.

EXAMPLE 2

A mixture of the vapours of durene and isodurene in the proportion of 80 parts by weight of isodurene and 20 parts by weight of durene was passed at a pressure of 5 mms. Hg absolute pressure through a silica tube heated to 870° C. at such a rate that the vapour was subjected to this temperature for 0.07 second. The vapour leaving the tube was cooled and washed with ether as in Example 1 and the product was in the form of a yellowish flexible film. By moulding the product as in the previous example, a flexible product of somewhat similar properties was obtained.

EXAMPLE 3

A mixture of the vapours of p-xylene, durene, and isodurene in the proportions of 20 parts by weight of p-xylene, 20 parts by weight of durene, and 60 parts by weight of isodurene was passed at a pressure of 5 mms. Hg absolute pressure through a silica tube heated to 870° C., the contact time within the tube being 0.07 second. The vapour leaving the tube was cooled and washed with ether as in the previous examples yielding a flexible product. It was easy to mould at 300° C. and under moderate pressure. The moulding was flexible and rubberlike and had similar properties to that produced in the previous examples.

EXAMPLES 4 AND 5

The procedure of Example 2 was repeated with a mixture of the vapours of pseudocumene and durene containing 60% by weight of pseudocumene and also with a mixture of the vapours of pseudocumene, durene, and isodurene containing 35% by weight of durene, 25% by weight of isodurene and 40% by weight of pseudocumene. Flexible products were obtained in each case which on moulding as previously described gave flexible mouldings.

We claim:

1. Process for the production of a solid polymeric product which comprises pyrolyzing a mixture of the vapours of at least two polymethyl benzenes having from 2 to 6 methyl groups substituted in the nucleus with two of the methyl groups in the para positions, by subjecting the mixed vapours under a total pressure not substantially exceeding 200 mm. Hg absolute to a temperature of from 700 to 1000° C. for not more than 1 second and cooling the resulting vapours to a temperature at which a solid polymeric product is deposited.

2. A process as claimed in claim 1 in which the said temperature is from 800 to 1000° C. and the contact time at this temperature is less than 1 second.

3. A process as claimed in claim 1 in which said temperature is from 850 to 950° C. and said contact time is from 0.5 to 0.02 second.

4. A process as claimed in claim 1 in which the pyrolysis is carried out with the said vapours exerting a pressure not in excess of 10 mms. Hg absolute pressure.

5. A process as claimed in claim 1 in which the pyrolysis is carried out with the vapour of the aromatic hydrocarbon diluted with an inert gas and under a total pressure ranging from 100 to 200 mms. Hg absolute pressure.

6. A process as claimed in claim 1 in which said mixture of vapours consists of a mixture of the vapours of pseudocumene and p-xylene.

7. A process as claimed in claim 1 in which said mixture of vapours consists of the vapours of p-xylene, durene, and isodurene.

8. A process as claimed in claim 1 in which said mixture of vapours consists of the vapours of p-xylene and isodurene.

9. A process as claimed in claim 1 in which said mixture of vapours consists of the vapours of pseudocumene and durene.

10. A process as claimed in claim 1 in which said mixture of vapours consists of the vapours of durene and isodurene.

11. A process as claimed in claim 6 in which the pseudocumene constitutes more than 50% by weight of the said mixture.

12. A process as claimed in claim 7 in which the isodurene constitutes more than 50% by weight of the mixture.

13. A process as claimed in claim 1 in which the mixture of vapours contains more than 50% by weight of pseudocumene.

14. As a new product, a solid polymeric reaction product of a pyrolyzed mixture of the vapours of at least two polymethyl benzenes having from 2 to 6 methyl groups substituted in the nucleus with two of the methyl groups in para positions; said reaction product having a high thermal stability, good insulating properties and capable of being molded.

15. As a new product, a solid polymeric reaction product of a pyrolyzed mixture of the vapours of paraxylene and pseudocumene; said reaction product having a high thermal stability, good insulating properties and capable of being molded.

16. As a new product, a solid polymeric reaction product of a pyrolyzed mixture of the vapours of paraxylene, durene and isodurene; said reaction product having a high termal stability, good insulating properties and capable of being molded.

17. As a new product, a solid polymeric reaction product of a pyrolyzed mixture of the vapours of paraxylene and isodurene; said reaction product having a high thermal stability, good insulating properties and capable of being molded.

18. As a new product, a solid polymeric reaction product of a pyrolyzed mixture of the vapours of pseudocumene and durene; said reaction product having a high thermal stability, good insulating properties and capable of being molded.

19. As a new product, a solid polymeric reaction product of a pyrolyzed mixture of the vapours of durene and isodurene; said reaction product having a high thermal stability, good insulating properties and capable of being molded.

References Cited in the file of this patent

UNITED STATES PATENTS

| | | |
|---|---|---|
| 1,875,317 | Carothers | Sept. 6, 1932 |
| 2,143,509 | Conover | Jan. 10, 1939 |
| 2,524,318 | Kharasch | Oct. 3, 1950 |

FOREIGN PATENTS

| | | |
|---|---|---|
| 650,947 | Great Britain | Mar. 7, 1951 |